US011990273B2

(12) United States Patent
Zhu et al.

(10) Patent No.: US 11,990,273 B2
(45) Date of Patent: May 21, 2024

(54) MANUFACTURING METHOD OF THIN-FILM POWER INDUCTOR AND THIN-FILM POWER INDUCTOR

(71) Applicant: Hengdian Group DMEGC Magnetics Co., LTD, Dongyang (CN)

(72) Inventors: Quan Zhu, Dongyang (CN); Yangdong Yu, Dongyang (CN); Gan Liu, Dongyang (CN); Leijie Wang, Dongyang (CN)

(73) Assignee: Hengdian Group DMEGC Magnetics Co., LTD, Jinhua (CN)

( * ) Notice: Subject to any disclaimer, the term of this patent is extended or adjusted under 35 U.S.C. 154(b) by 0 days.

(21) Appl. No.: 17/415,550

(22) PCT Filed: Nov. 27, 2020

(86) PCT No.: PCT/CN2020/132139
§ 371 (c)(1),
(2) Date: Jun. 17, 2021

(87) PCT Pub. No.: WO2022/057089
PCT Pub. Date: Mar. 24, 2022

(65) Prior Publication Data

US 2023/0215624 A1 Jul. 6, 2023

(30) Foreign Application Priority Data

Sep. 15, 2020 (CN) ......................... 202010966367.4

(51) Int. Cl.
*H01F 7/06* (2006.01)
*H01F 41/02* (2006.01)
*H01F 41/04* (2006.01)

(52) U.S. Cl.
CPC ....... *H01F 41/0233* (2013.01); *H01F 41/043* (2013.01)

(58) Field of Classification Search
CPC .. H01F 27/292; H01F 41/0233; H01F 41/043; H01F 17/0013
See application file for complete search history.

(56) References Cited

U.S. PATENT DOCUMENTS 9,218,559 B2 * 12/2015 Koujima ............ H01F 17/0033
9,311,590 B2 * 4/2016 Koujima ............... H05K 1/165
(Continued)

FOREIGN PATENT DOCUMENTS

CN 103180919 A 6/2013
CN 103814419 A 5/2014
(Continued)

OTHER PUBLICATIONS

International Search Report for PCT Application No. PCT/CN2020/132139, dated Jun. 17, 2021.

*Primary Examiner* — Paul D Kim
(74) *Attorney, Agent, or Firm* — Andrus Intellectual Property Law, LLP

(57) ABSTRACT

A manufacturing method of a thin-film power inductor includes: Alloy powder is mixed with plasticizer, adhesive, curing agent, dispersing agent and organic solvent to form slurry; the slurry is applied on a PET film, and drying to form a magnetic band; and the magnetic band is cut to form a plurality of magnetic sheets. A hole is opened on a magnetic sheet to form a hole-shaped magnetic sheet. Electrodes are processed on an insulating substrate to form a coil layer. Magnetic sheets, hole-shaped magnetic sheets, and the coil layer are stacked to form a block. The block is pressed, and the block is cut to form an individual product. The individual product is baked to form a main body. Silver paste is applied on the main body to form outer electrodes. A nickel layer and a tin layer are electroplated on outer electrodes to form a thin-film power inductor.

18 Claims, 4 Drawing Sheets

(56) References Cited

U.S. PATENT DOCUMENTS

| | | | | |
|---|---|---|---|---|
| 2014/0285304 | A1 | 9/2014 | Yoo et al. | |
| 2017/0148562 | A1* | 5/2017 | Lee | H01F 27/292 |
| 2018/0374626 | A1* | 12/2018 | Jang | H01F 27/323 |

FOREIGN PATENT DOCUMENTS

| | | | |
|---|---|---|---|
| CN | 103887053 | A | 6/2014 |
| CN | 104250096 | A | 12/2014 |
| CN | 105448467 | A | 3/2016 |
| CN | 105590747 | A | 5/2016 |
| CN | 106486238 | A | 3/2017 |
| CN | 106653356 | A | 5/2017 |
| CN | 111393171 | A | 7/2020 |
| KR | 20060087252 | A | 8/2006 |

* cited by examiner

MANUFACTURING METHOD OF THIN-FILM POWER INDUCTOR AND THIN-FILM POWER INDUCTOR

CROSS-REFERENCE TO RELATED APPLICATION(S)

This is a national stage application filed under 37 U.S.C. 371 based on International Patent Application No. PCT/CN2020/132139, filed Nov. 27, 2020, which claims priority to Chinese Patent Application No. 202010966367.4 filed with the CNIPA on Sep. 15, 2020, the disclosure of which is incorporated herein by reference in its entirety.

TECHNICAL FIELD

The present disclosure relates to the technical field of inductances, for example, to a manufacturing method of a thin-film power inductor and a thin-film power inductor.

BACKGROUND

With the rapid development of electronic power, the demand for high-power and high-current inductors is increasing. In high power and high current applications, alloy magnetic materials with low loss, low cost and high conversion efficiency are more and more favored. However, as the trend of miniaturization and integration of electronics is increasingly clear, traditional winding and integral molding process cannot meet the development requirements. In order to achieve high current, the mode of filling silver paste in a printing groove is adopted in the related art to increase the thickness of a silver layer, which, however, limits the development of miniaturization. Moreover, for the design of the structure of an inductor in the related art, a coil layer is firstly manufactured, and then magnetic sheets are directly stacked on an upper surface and a lower surface of the coil layer. This mode of directly superposing planar magnetic sheets is prone to lead to unevenness of thickness due to an open space between parts of electrodes of the coil.

SUMMARY

The present disclosure provides a manufacturing method of a thin-film power inductor and a thin-film power inductor. The manufacturing process of the thin-film power inductor is simple and thus may be applied to the manufacturing of small thin-film inductors on a large scale, and the thickness of the manufactured thin-film inductors is uniform.

A manufacturing method of a thin-film power inductor is provided and includes steps described below.

Alloy powder is evenly mixed with plasticizer, adhesive, curing agent, dispersing agent and organic solvent to form slurry; the slurry is evenly applied on a polyethylene terephthalate (PET) film, and drying is performed to form a magnetic band; and the magnetic band is cut to form a plurality of magnetic sheets.

A hole is opened on each of a part of the plurality of magnetic sheets to form one of hole-shaped magnetic sheets.

Electrodes are processed on an insulating substrate to form a coil layer, where a shape of each of the electrodes is consistent with a shape of the hole of a respective one of the hole-shaped magnetic sheets.

One of the plurality of magnetic sheets, one of the hole-shaped magnetic sheets, the coil layer, another one of the hole-shaped magnetic sheets and another one of the plurality of the magnetic sheets are sequentially stacked and pressed to form a block, where hole-shaped magnetic sheets and the coil layer are aligned with each other and stacked, and each of the electrodes is disposed in the hole of the respective one of the hole-shaped magnetic sheets.

The block is secondarily pressed, and a secondarily pressed block is cut to form an individual product.

A cut individual product formed by cutting is baked to form a main body.

Silver paste is applied on two ends of the main body to form outer electrodes respectively such that the outer electrodes are electrically connected to the electrodes respectively.

A nickel layer and a tin layer are electroplated on a surface of each of the outer electrodes to form a thin-film power inductor.

Optionally, the step in which the electrodes are processed on the insulating substrate to form the coil layer includes steps described below.

A conductive hole is opened in the insulating substrate, and curable metal paste is poured into the conductive hole by a screen printing process and is dried to form a conductive column.

A metal layer is formed by sputtering on the insulating substrate, and photoresist is applied on the metal layer and then is exposed and developed such that a pattern of one of the electrodes appears on the photoresist.

Etching is performed, that is, a groove is etched at a position on the photoresist where the pattern of the one of the electrodes appears; photoresist is applied again to fill the groove formed by etching and to cover photoresist previously applied outside the groove; and exposure and development are performed again and then photoresist on the pattern of the one of the electrodes is removed.

The one of the electrodes is formed on the pattern of the one of the electrodes by electroplating and thickening, and photoresist is removed outside the one of the electrodes.

Another one of the electrodes is formed on a side of the insulating substrate where no electrode is formed according to above steps to obtain the coil layer, where the electrodes on two sides of the coil layer are connected through the conductive column.

Optionally, the step in which the electrodes are processed on the insulating substrate to form the coil layer includes steps described below.

Curable metal paste is made into a pattern of the electrodes by a photolithography process and then is cured at a temperature ranging from 150° C. to 200° C. to make the coil layer.

Optionally, the coil layer is made by a chemical plating process.

Optionally, the coil layer is single-layer, double-layer or multilayer, and layers of a double-layer coil layer are separated by an insulating substrate, or layers of a multilayer coil layer are separated by an insulating substrate.

Optionally, the block is secondarily pressed by an isostatic press, where the isostatic press performs pressing at a pressure ranging from 5 MPa to 50 MPa, during a time ranging from 1 minute to 30 minutes, and at a temperature ranging from 50° C. to 90° C.

Optionally, the step in which the cut individual product is baked includes a step described below. The cut individual product is baked at a temperature ranging from 160° C. to 200° C., and during a time ranging from 10 minutes to 40 minutes.

Optionally, the silver paste is cured silver paste, a curing temperature at which the cured silver paste is cured ranges from 120° C. to 200° C., and a curing time of the cured silver paste ranges from 30 minutes to 120 minutes.

Optionally, a thickness of each of the plurality of the magnetic sheets is greater than a thickness of each of the hole-shaped magnetic sheets formed by opening the hole on each of the plurality of the magnetic sheets.

A thin-film power inductor is further provided and is manufactured by adopting the above manufacturing method of a thin-film power inductor.

REFERENCE LIST

Figure 1:
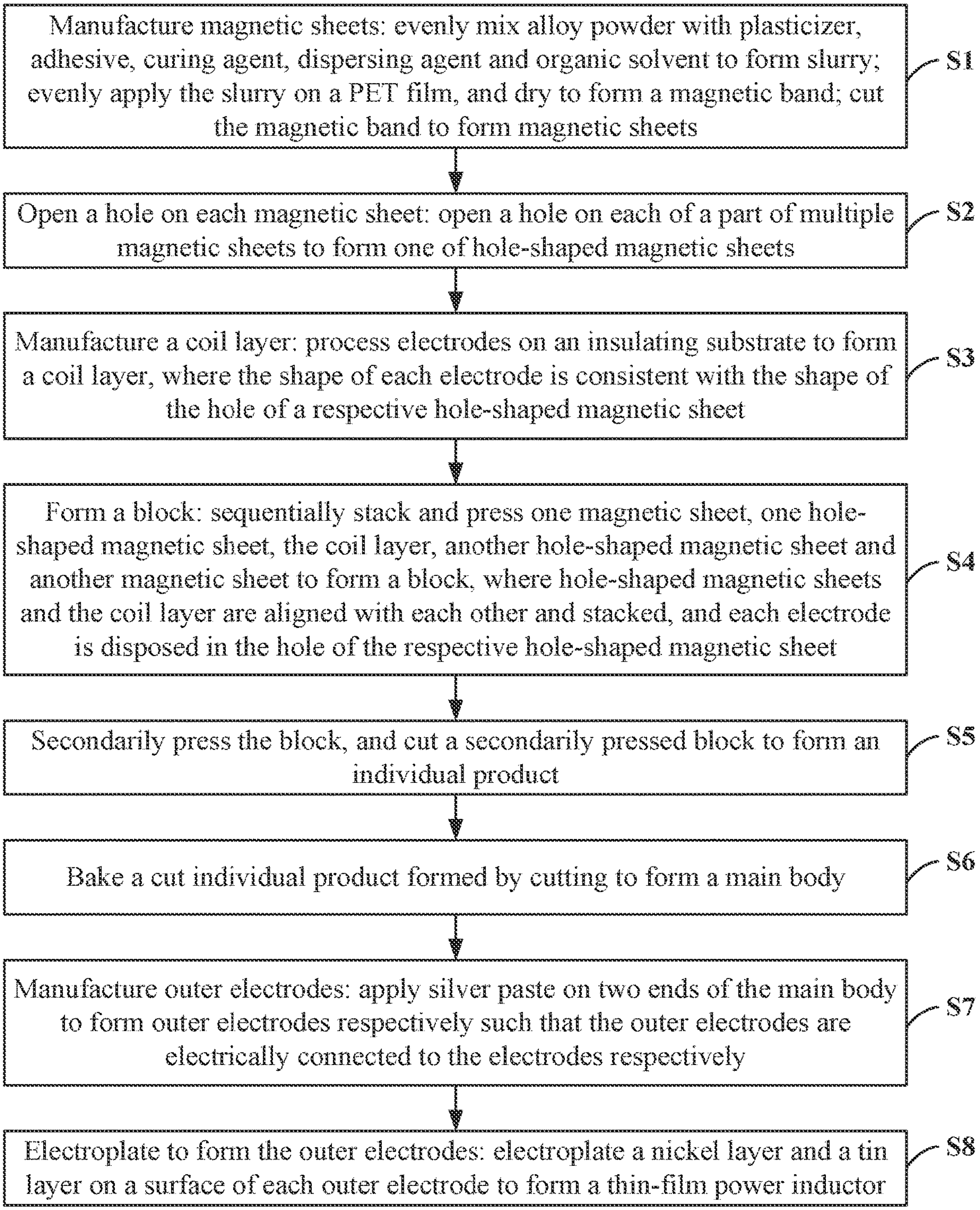
FIG. 1 is a process flowchart of a manufacturing method of a thin-film power inductor provided by an embodiment of the present disclosure.

1 magnetic sheet
2 hole-shaped magnetic sheet
3 coil layer
31 insulating substrate
32 electrode
33 conductive hole
4 main body
5 outer electrode

DETAILED DESCRIPTION

The present disclosure is described below in conjunction with the drawings and embodiments. The embodiments described herein are merely intended to explain the present disclosure.

In the description of the present disclosure, unless otherwise expressly specified and limited, the term "connected to each other", "connected" or "secured" is to be construed in a broad sense, for example, as securely connected, detachably connected or integrated; mechanically connected or electrically connected; directly connected to each other or indirectly connected to each other via an intermediary; or intraconnected between two components or interactional between two components. For those of ordinary skill in the art, meanings of the preceding terms in the present disclosure may be understood based on situations.

In the present disclosure, unless otherwise expressly specified and limited, when a first feature is described as "on" or "below" a second feature, the first feature and the second feature may be in direct contact or may be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of the embodiment of the present disclosure, orientations or position relations indicated by terms such as "upper", "lower", "left" and "right" are based on orientations or position relations shown in the drawings. These orientations or position relations are intended only to facilitate description and simplify operations and not to indicate or imply that a device or element referred to must have such designated orientations or must be configured or operated in such designated orientations. In addition, the terms "first" and "second" are used only to distinguish between descriptions and have no special meaning.

The present disclosure provides a manufacturing method of a thin-film power inductor. As shown in FIG. 1, the manufacturing method includes steps described below.

In step S1, magnetic sheets 1 are manufactured. Alloy powder is evenly mixed with plasticizer, adhesive, curing agent, dispersing agent and organic solvent to form slurry; the slurry is evenly applied on a polyethylene terephthalate (PET) film, and drying is performed to form a magnetic band; and the magnetic band is cut to form multiple magnetic sheets 1.

Optionally, the manufacturing process flow of the magnetic sheets 1 in step S1 is as follows.

In step S11, the slurry is compounded. Alloy powder is evenly mixed with plasticizer, adhesive, curing agent, dispersing agent and organic solvent to form slurry with certain viscosity. The alloy powder may be iron-silicon-chromium soft magnetic alloy powder. The particle size of the alloy powder may range from 5 μm to 15 μm, and the alloy powder is subjected to insulation covering treatment. The adhesive and the curing agent may firstly be mixed into high-temperature curing adhesive, and then the high-temperature curing adhesive is mixed with the alloy powder, the plasticizer, the dispersing agent and the organic solvent. The high-temperature curing adhesive may be formed by mixing adhesive of epoxy and curing agent of polycyanamide according to a certain proportion, may be formed by mixing adhesive of epoxy and curing agent of imidazole according to a certain proportion, or may be formed by mixing adhesive of epoxy and curing agent of 4,4'-diaminodiphenylmethane according to a certain proportion.

In step S12, tape casting is performed. The mixed slurry is evenly applied on the PET film by a tape casting machine, and the PET film coated with the mixed slurry is dried to form a magnetic band. The thickness of the magnetic band ranges from 10 μm to 200 μm, and the tape casting preparation may be performed according to different requirements for thickness.

In step S13, cutting is performed. The magnetic band subjected to tape casting is cut into magnetic sheets 1 of specified dimensions. The length of each magnetic sheet 1 may range from 6 inches to 10 inches, and the width of each magnetic sheet 1 may range from 6 inches to 10 inches.

In step S2, a hole is opened on each magnetic sheet 1. A hole is opened on each of a part of the multiple magnetic sheets 1 to form one of hole-shaped magnetic sheets 2.

Figure 2:
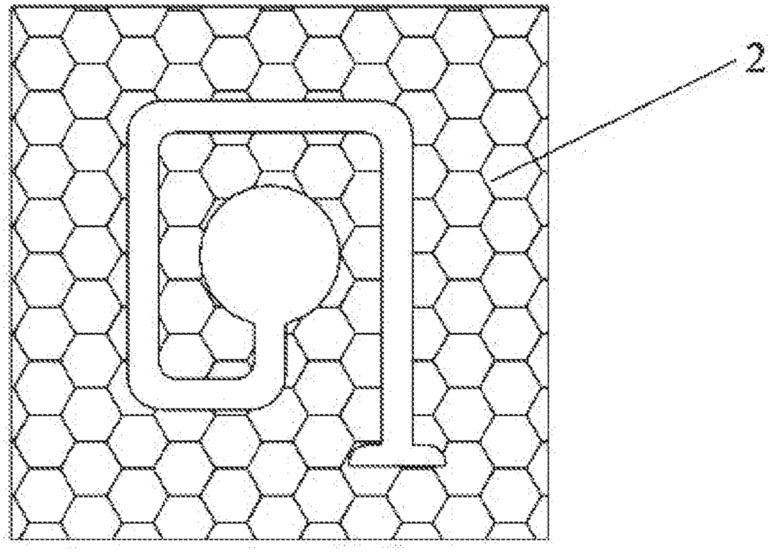
FIG. 2 is a schematic view of a hole-shaped magnetic sheet according to an embodiment of the present disclosure.

Optionally, opening a hole on the magnetic sheet 1 in step S2 is to open a hole at a designated position of the magnetic sheet 1 according to design requirements by using a hole-opening machine, the purpose of which is to remove the material at the position corresponding to a pattern of an electrode 32 on the magnetic sheet 1, and the pattern of the part where the material is removed of the magnetic sheet 1 after laser hole-opening is consistent with the pattern of the electrode 32 (as shown in FIG. 2).

In step S3, a coil layer 3 is manufactured. Electrodes 32 are processed on an insulating substrate 31 to form a coil layer 3. The shape of each electrode 32 is consistent with the shape of the hole of a respective hole-shaped magnetic sheet 2.

Optionally, the manufacturing of the coil layer 3 in step S3 is to manufacture the designed pattern of each electrode 32 in the coil layer 3 on an insulating substrate 31. The coil layer 3 may be single-layer, double-layer or multilayer, and layers of a double-layer coil layer 3 are separated by an insulating substrate 31, or layers of a multilayer coil layer 3 are separated by an insulating substrate 31. The insulating substrate 31 may be made of a low-dielectric-constant insulating material such as polyimide, silicon dioxide, or ceramic. The material of the electrodes 32 may be copper, silver or gold. Low-temperature curable metal paste may be made into the pattern of the electrodes 32 by a photolithography process and then is cured at a high temperature ranging from 150° C. to 200° C. to make the coil layer 3, or the coil layer 3 may be made by a chemical plating process, or the coil layer 3 may be made by photolithography and electroplating processes.

Figure 3:
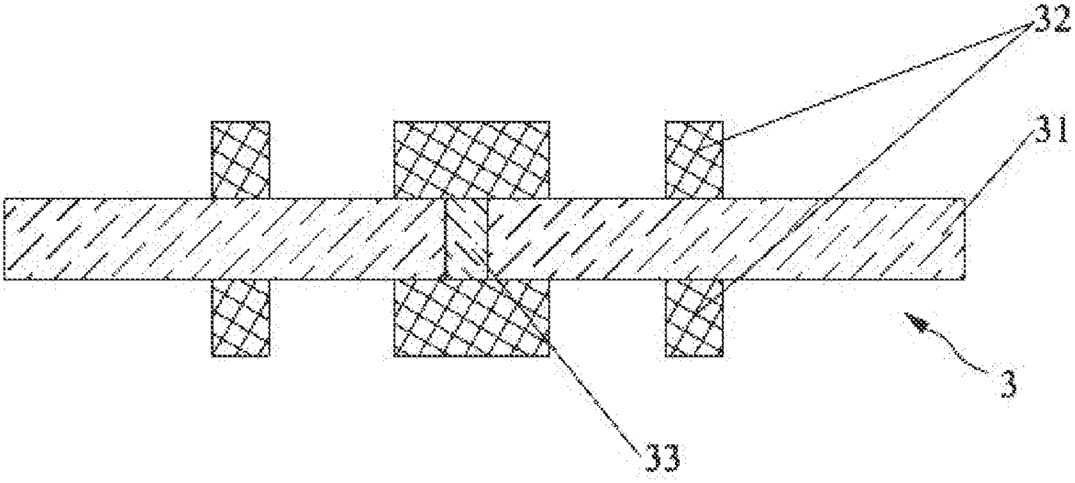
FIG. 3 is a sectional view of a coil layer according to an embodiment of the present disclosure.

Optionally, as shown in FIG. 3, the manufacturing process of the coil layer 3 in step S3 of the embodiment adopts the above photolithography and electroplating processes, and the flow is described below.

In step S31, a conductive hole 33 is opened in the insulating substrate 31, and curable metal paste is poured into the conductive hole 33 by a screen printing process and is dried to form a conductive column.

In step S32, a metal layer is formed by sputtering on the insulating substrate 31, and photoresist is applied on the metal layer. Optionally, the applying of the photoresist may be operated under a yellow lamp. A scraper is used for applying, and the front and back sides of the metal layer are both coated twice. After the first time of applying, as long as faces of the metal layer are not sticky, the second time of applying may be performed. The drying speed should not be too fast, the drying temperature should be controlled below 35° C., and a hair dryer or an oven may be used for drying. After thorough drying, exposure may be performed. Then, exposure and development are performed such that the pattern of one electrode 32 appears on the photoresist. A mist flow may be used for development. Optionally, the metal layer may be a copper layer.

In step S33, etching is performed. A groove is etched at a position on the photoresist where the pattern of the one electrode 32 appears, and the pattern of the groove is the pattern of the one electrode 32. Photoresist is applied again to fill the groove formed by etching and to cover photoresist previously applied outside the groove. Exposure and development are performed again such that the pattern of the one electrode 32 appears and then photoresist on the pattern of the one electrode 32 is removed. Photoresist is applied again and exposed again, through which the strength of the applied photoresist can be strengthened.

In step S34, the one electrode 32 is formed on the position of the pattern of the one electrode 32 on the insulating substrate 31 by electroplating and thickening, and photoresist outside the one electrode 32 is removed.

In step S35, steps S32 to S34 are repeated on a side of the insulating substrate 31 where no electrode 32 is formed to obtain the required coil layer 3. Two layers of the electrodes 32 of the coil layer 3 are connected through the conductive column in the conductive hole 33.

Figure 4:
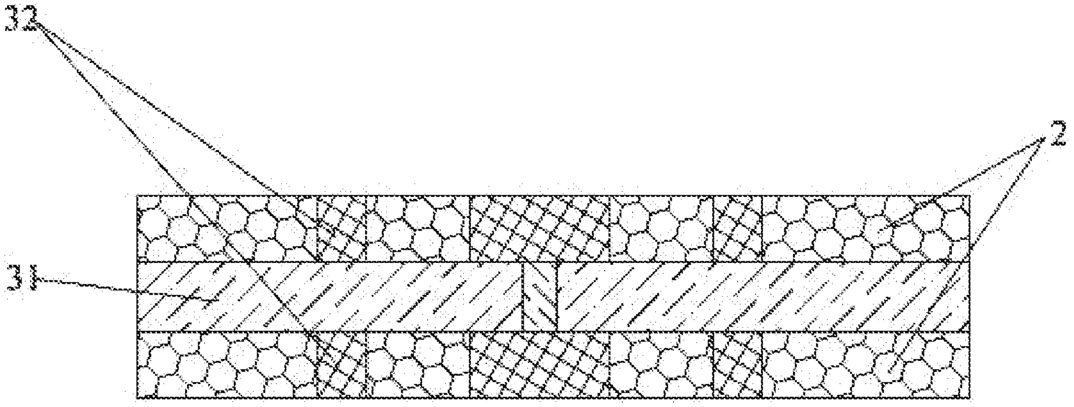
FIG. 4 is a sectional view of a coil layer stacked with hole-shaped magnetic sheets according to an embodiment of the present disclosure.
Figure 5:
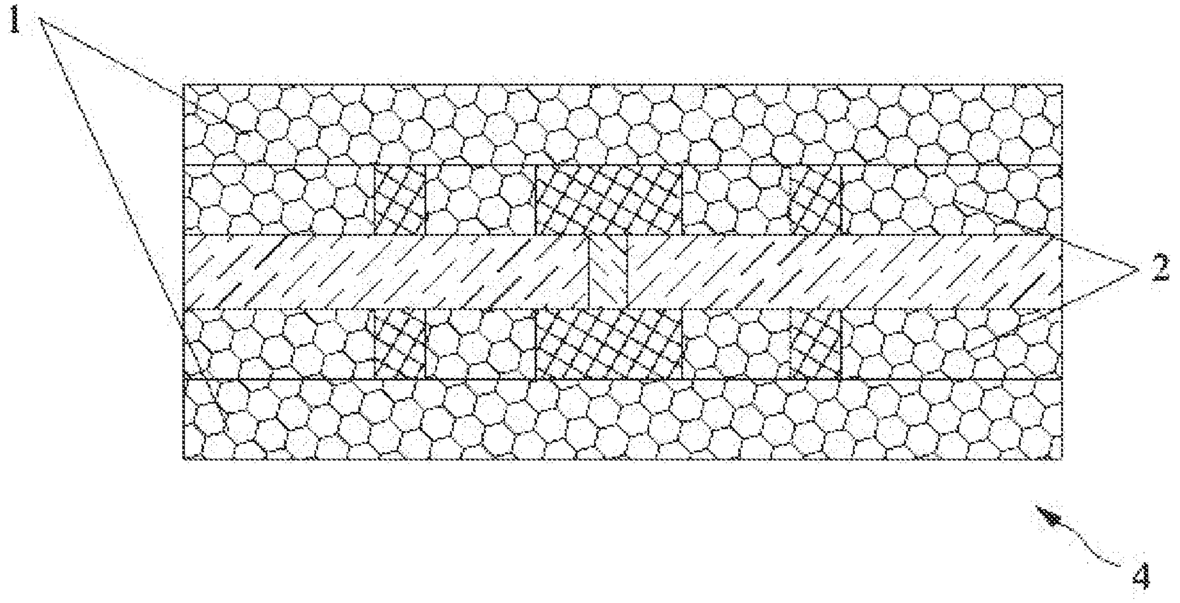
FIG. 5 is a sectional view of a main body formed by a coil layer stacked with hole-shaped magnetic sheets and magnetic sheets according to an embodiment of the present disclosure.

In step S4, a block is formed. As shown in FIG. 4 and FIG. 5, one magnetic sheet 1, one hole-shaped magnetic sheet 2, the coil layer 3, another hole-shaped magnetic sheet 2 and another magnetic sheet 1 are sequentially stacked and pressed to form a block. Hole-shaped magnetic sheets 2 and the coil layer 3 are aligned with each other and stacked such that the hole-shaped magnetic sheets 2 are filled in gaps between the electrodes 32 of the coil layer 3, and each electrode 32 is disposed in the hole of the respective hole-shaped magnetic sheet 2.

In step S5, the block is secondarily pressed, and a secondarily pressed block is cut to form an individual product.

Optionally, step S5 includes steps described below.

In step S51, isostatic pressing is performed. The block is put into an isostatic press to be secondarily pressed. The pressure of the secondary pressing ranges from 5 MPa to 50 MPa, the time of the secondary pressing ranges from 1 minute to 30 minutes, and the temperature of the secondary pressing ranges from 50° C. to 90° C. The above step has the advantage that equal pressure can be applied to each surface, the magnetic sheets 1 and the adhesive can be softened by high temperature, internal gaps of the block can be filled under the action of the pressure, and thus the block is densified.

In step S52, cutting is performed. The entire block subjected to the isostatic pressing is cut into an individual product according to a design by using a cutting machine. The cutting machine may be a blade cutting machine, a rounded blade cutting machine or a laser cutting machine.

In step S6, a cut individual product formed by cutting is baked to form a main body 4. Optionally, the cut individual product formed by cutting in step S6 is baked at a temperature ranging from 160° C. to 200° C. to form the main body 4, and the time for baking ranges from 10 minutes to 40 minutes. Baking can make the photoresist cured.

Figure 6:
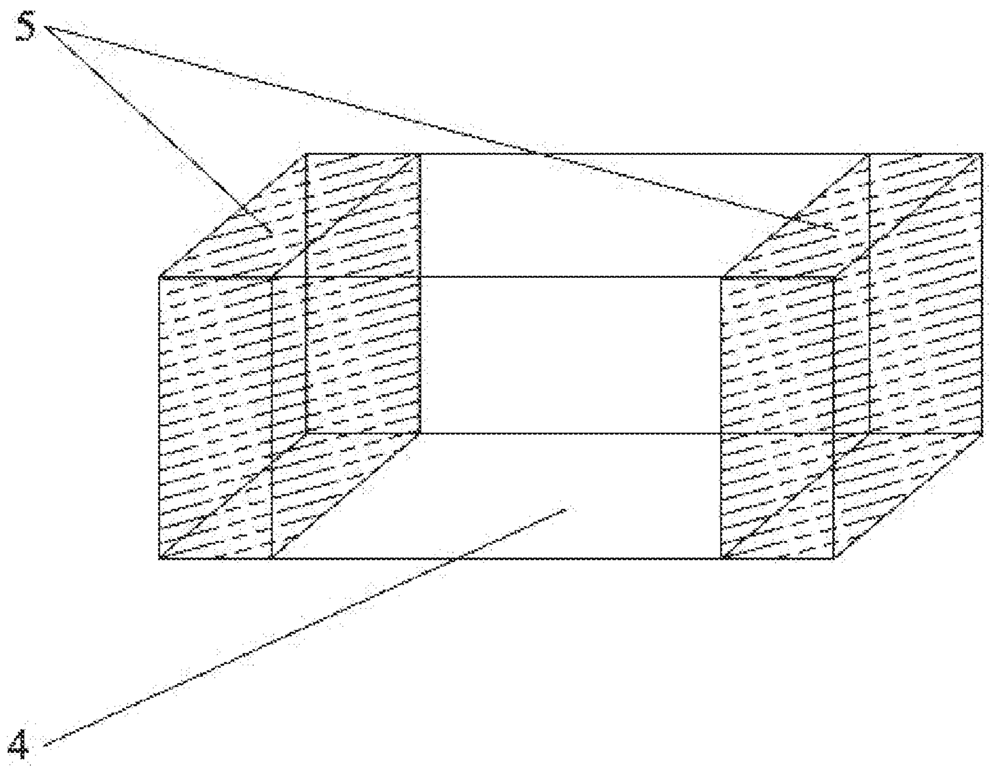
FIG. 6 is an external view of a main body after being electroplated to form outer electrodes according to an embodiment of the present disclosure.
Figure 7:
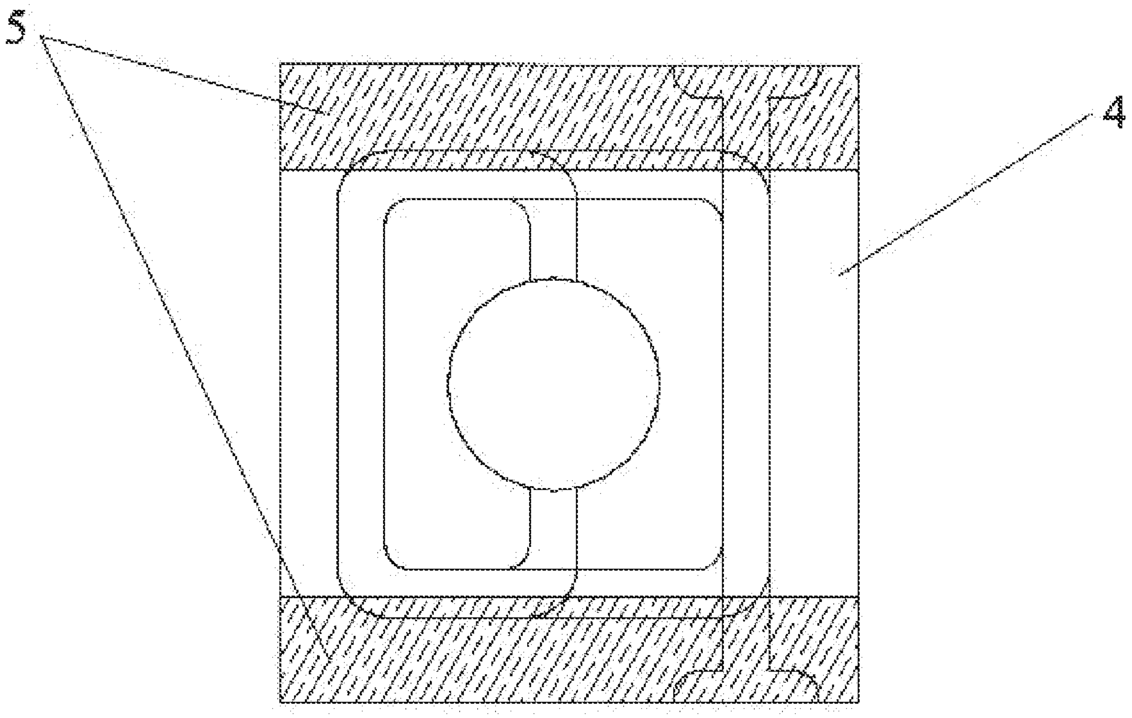
FIG. 7 is a top view of a main body after being electroplated to form outer electrodes according to an embodiment of the present disclosure.

In step S7, outer electrodes 5 are manufactured. As shown in FIG. 6 and FIG. 7, silver paste is applied on two ends of the main body 4 to form outer electrodes 5 respectively such that the outer electrodes 5 are electrically connected to the electrodes 32 respectively. Optionally, the silver paste in step S7 is low-temperature cured silver paste, and silver sintering is not required. The curing temperature ranges from 120° C. to 200° C., and the holding time ranges from 30 minutes to 120 minutes. Cured end silver has excellent adhesion and conductivity.

In step S8, the outer electrodes 5 are electroplated. A nickel layer and a tin layer are electroplated on a surface of each outer electrode 5 to form a thin-film power inductor. Optionally, in step S8, the thickness of the nickel layer and the thickness of the tin layer both range from 1 μm to 5 μm.

A hole is opened on each of a part of the magnetic sheets 1 to form one of hole-shaped magnetic sheets 2, and the part, removed by opening the hole, of the hole-shaped magnetic sheet 2 has the same shape as the electrode 32 in the coil layer 32. Therefore, hole-shaped magnetic sheets 2 and the coil layer 3 may be directly aligned with each other and stacked such that the hole-shaped magnetic sheets 2 are filled in gaps between the electrodes 32 of the coil layer 3, and each electrode 32 is disposed in the hole of the respective hole-shaped magnetic sheet 2.

The manufacturing process of the thin-film power inductor is simple and thus may be applied to the manufacturing of small thin-film inductors on a large scale, and the thickness of the manufactured thin-film inductors is uniform.

The above manufacturing method of a thin-film power inductor is described and illustrated below by embodiments.

Embodiment One

The manufacturing method of a thin-film power inductor provided by the present disclosure is used to manufacture an inductor. External dimensions of the thin-film inductor to be processed are set as follows: the length of the inductor is 1.2 mm, the width of the inductor is 1.0 mm, the height of the inductor is less than 0.3 mm, inductance is 10 nH, the internal resistance of the inductor is less than or equal to 30 mΩ, the line thickness of an electrode is designed to be 30 μm, and the line width of an electrode is 90 μm. The processing steps are as follows.

In step S1, magnetic sheets 1 are manufactured. Alloy powder is evenly mixed with plasticizer, adhesive, curing agent, dispersing agent and organic solvent to form slurry. The alloy powder is iron-silicon-chromium soft magnetic alloy powder. The particle size of the alloy powder is 6 μm, and the alloy powder is subjected to insulation covering treatment. The adhesive and the curing agent may be preferentially mixed into high-temperature curing adhesive, and then the high-temperature curing adhesive is mixed with the alloy powder, the plasticizer, the dispersing agent and the organic solvent. The high-temperature curing adhesive is formed by mixing epoxy and polycyanamide. The slurry is evenly applied on a PET film, and drying is performed to form a magnetic band. The thickness of the PET film is 50 μm, release force ranges from 10 g/inch to 25 g/inch, the temperature for drying ranges from 60° C. to 90° C., and the speed of drying ranges from 3 m/min to 5 m/min. The magnetic band is cut to form multiple magnetic sheets 1, and the length and the width of each magnetic sheet 1 both are 6 inches.

In step S2, a hole is opened on each magnetic sheet 1. A hole is opened on each of a part of the multiple magnetic sheets 1 to form one of hole-shaped magnetic sheets 2. The thickness of each hole-shaped magnetic sheet 2 is calculated by shrinkage to be 32 μm.

In step S3, a coil layer 3 is manufactured. Electrodes 32 are processed on an insulating substrate 31 to form a coil layer 3. The shape of each electrode 32 is consistent with the shape of the hole of a respective hole-shaped magnetic sheet 2. The thickness of each electrode is 30 μm.

In step S4, a block is formed. One magnetic sheet 1, one hole-shaped magnetic sheet 2, the coil layer 3, another hole-shaped magnetic sheet 2 and another magnetic sheet 1 are sequentially stacked and pressed to form a block. Hole-shaped magnetic sheets 2 and the coil layer 3 are aligned with each other and stacked such that the hole-shaped magnetic sheets 2 are filled in gaps between the electrodes 32 of the coil layer 3, and each electrode 32 is disposed in the hole of the respective hole-shaped magnetic sheet 2. The thickness of each magnetic sheet 1 is 100 μm.

In step S5, the block is put into an isostatic press to be secondarily pressed. The pressure of the secondary pressing is 10 MPa, the time of the secondary pressing is 15 minutes, and the temperature of the secondary pressing is 75° C. A secondarily pressed block is cut to form an individual product.

In step S6, a cut individual product formed by cutting is baked at a temperature of 180° C. to form a main body 4, and the holding time for baking is 30 minutes.

In step S7, outer electrodes 5 are manufactured. Silver paste is applied on two ends of the main body 4 to form outer electrodes 5 respectively such that the outer electrodes 5 are electrically connected to the electrodes 32 respectively. Then, baking is performed. The temperature for baking is 175° C., and the time for baking is 60 minutes. End silver cured by baking has excellent adhesion and conductivity.

In step S8, the outer electrodes 5 are formed by electroplating. A nickel layer and a tin layer are electroplated on a surface of each outer electrode 5 to form a thin-film power inductor. The thickness of the nickel layer and the thickness of the tin layer both range from 1 μm to 3 μm.

TABLE 1 sample 1, sample 2 and sample 3 prepared by the method of embodiment one, whose dimensions and performance are tested

| Item | Sample 1 | Sample 2 | Sample 3 | Average |
|---|---|---|---|---|
| Dimension of the product L/mm | 1.21 | 1.20 | 1.21 | 1.206 |
| Dimension of the product W/mm | 1.02 | 1.01 | 1.03 | 1.02 |
| Dimension of the product H/mm | 0.27 | 0.28 | 0.27 | 0.27 |
| Inductance L/nH | 10.28 | 10.12 | 10.25 | 10.22 |
| Internal resistance of the inductor RDC/mΩ | 23 | 25 | 24 | 24 |
| Quality factor of the inductor Q | 16 | 16 | 16 | 16 |
| Whether overplating | No | No | No | Qualified |

Through the above data, it can be found that the thin-film power inductor manufactured by this method has good performance consistency and satisfies design requirements.

OTHER EMBODIMENTS

Some variations may be made in other embodiments. For example, the pattern of each electrode 32 may be changed according to actual needs. The electrode 32 on the upper end surface of the insulating substrate 31 may not be connected to the electrode 32 on the lower end surface of the insulating substrate 31, two ends of the electrode 32 on the upper end surface of the insulating substrate 31 may be connected to one outer electrode 5 together, and two ends of the electrode 32 on the lower end surface of the insulating substrate 31 may be connected to another outer electrode 5 together; at this time, the insulating substrate 31 does not need to be opened with a conductive hole 33. The line widths of electrodes 32 may be different, and other manufacturing process parameters and materials may be of the same configuration.

A thin-film power inductor provided by the present disclosure which is manufactured by adopting the manufacturing method provided by the present disclosure includes a main body 4 and two outer electrodes 5. The two outer electrodes 5 are respectively disposed on outer surfaces of two ends of the main body 4. The main body 4 includes a magnetic sheet 1, a hole-shaped magnetic sheet 2, a coil layer 3, another hole-shaped magnetic sheet 2 and another magnetic sheet 1 which are sequentially disposed. The coil layer 3 includes an insulating substrate 31, an electrode 32 disposed on the upper end surface of the insulating substrate 31, and an electrode 32 disposed on the lower end surface of the insulating substrate 31. A conductive hole 33 is opened in the middle of the insulating substrate 31. One end of the electrode 32 on the upper end surface of the insulating substrate 31 is connected to one end of the electrode 32 on the lower end surface of the insulating substrate 31 through the conductive hole 33, the other end of the electrode 32 on the upper end surface of the insulating substrate 31 is connected to one outer electrode 5, and the other end of the electrode 32 on the lower end surface of the insulating substrate 31 is connected to another outer electrode 5. According to a thin-film power inductor provided by the present disclosure, a hole is opened on each of a part of the magnetic sheets 1 to form one of hole-shaped magnetic sheets 2, and the part, removed by opening the hole, of the hole-shaped magnetic sheet 2 has the same shape as the electrode 32 in the coil layer 32. Therefore, hole-shaped magnetic sheets 2 and the coil layer 3 may be directly aligned with each other and stacked such that the hole-shaped magnetic sheets 2 are filled in gaps between the electrodes 32 of the coil layer 3, and each electrode 32 is disposed in the hole of the respective hole-shaped magnetic sheet 2. The manufacturing process of the thin-film power inductor is simple and thus may be applied to the manufacturing of small thin-film inductors on a large scale, and the thickness of the manufactured thin-film inductors is uniform.

What is claimed is:

1. A manufacturing method of a thin-film power inductor, comprising:

evenly mixing an alloy powder with a plasticizer, an adhesive, curing agent, a dispersing agent and an organic solvent to form a slurry; evenly applying the slurry on a polyethylene terephthalate (PET) film, and drying the PET film coated with the slurry to form a magnetic band;

cutting the magnetic band to form a plurality of magnetic sheets;

opening a hole on some of the plurality of magnetic sheets to form hole-shaped magnetic sheets;

processing electrodes on an insulating substrate to form a coil layer, wherein a shape of each of the electrodes is consistent with a shape of the hole of a respective one of the hole-shaped magnetic sheets;

sequentially stacking and pressing one of the plurality of magnetic sheets, one of the hole-shaped magnetic sheets, the coil layer, another one of the hole-shaped magnetic sheets and another one of the plurality of the magnetic sheets to form a block, wherein the one of the hole-shaped magnetic sheets, the another one of the hole-shaped magnetic sheets and the coil layer are aligned with each other and stacked, and each of the electrodes is disposed in the hole of the respective one of the hole-shaped magnetic sheets;

secondarily pressing the block, and cutting the secondarily pressed block to form an individual product;

baking the cut individual product formed by cutting to form a main body;

applying a silver paste on two ends of the main body to form outer electrodes respectively such that the outer electrodes are electrically connected to the electrodes respectively; and electroplating a nickel layer and a tin layer on a surface of each of the outer electrodes to form the thin-film power inductor.

2. The manufacturing method of a thin-film power inductor according to claim 1, wherein processing the electrodes on the insulating substrate to form the coil layer comprises:

opening a conductive hole in the insulating substrate, pouring a curable metal paste into the conductive hole by a screen printing process, and drying the curable metal paste poured into the conductive hole to form a conductive column;

forming a metal layer by sputtering on the insulating substrate, applying a photoresist on the metal layer, and then exposing and developing the photoresist such that a pattern of one of the electrodes appears on the photoresist;

etching a groove at a position on the photoresist where the pattern of the one of the electrodes appears;

applying a photoresist again to fill the groove formed by etching and to cover the photoresist previously applied outside the groove; and exposing and developing all applied photoresist again and then removing the photoresist on the pattern of the one of the electrodes;

forming, by electroplating and thickening, the one of the electrodes on the pattern of the one of the electrodes, and removing the photoresist outside the one of the electrodes; and forming, according to above steps, another one of the electrodes on another side of the insulating substrate opposite to a side of the insulating substrate on which the one of the electrodes is located, wherein the electrodes on two sides of the insulating substrate are connected through the conductive column.

3. The manufacturing method of a thin-film power inductor according to claim 1, wherein processing the electrodes on the insulating substrate to form the coil layer comprising:

making a curable metal paste into a pattern of the electrodes by a photolithography process, and then curing the curable metal paste at a temperature ranging from 150° C. to 200° C. to make the coil layer.

4. The manufacturing method of a thin-film power inductor according to claim 1, wherein the coil layer is made by a chemical plating process.

5. The manufacturing method of a thin-film power inductor according to claim 1, wherein the coil layer is single-layer, double-layer or multilayer.

6. The manufacturing method of a thin-film power inductor according to claim 5, wherein the coil layer is a double-layer coil layer, and layers of the double-layer coil layer are separated by an insulating substrate.

7. The manufacturing method of a thin-film power inductor according to claim 5, wherein the coil layer is a multi-layer coil layer, and two layers of the multilayer coil layer are separated by an insulating substrate.

8. The manufacturing method of a thin-film power inductor according to claim 1, wherein the block is secondarily pressed by an isostatic press, wherein the isostatic press performs pressing at a pressure ranging from 5 MPa to 50 MPa, during a time ranging from 1 minute to 30 minutes, and at a temperature ranging from 50° C. to 90° C.

9. The manufacturing method of a thin-film power inductor according to claim 1, wherein baking the cut individual product comprises: baking the cut individual product at a temperature ranging from 160° C. to 200° C., and during a time ranging from 10 minutes to 40 minutes.

10. The manufacturing method of a thin-film power inductor according to claim 1, wherein the silver paste is a cured silver paste, a curing temperature at which the cured silver paste is cured ranges from 120° C. to 200° C., and a curing time of the cured silver paste ranges from 30 minutes to 120 minutes.

11. The thin-film power inductor according to claim 1, wherein baking the cut individual product comprises: baking the cut individual product at a temperature ranging from 160° C. to 200° C., and during a time ranging from 10 minutes to 40 minutes.

12. A thin-film power inductor, manufactured by the manufacturing method of claim 1.

13. The thin-film power inductor according to claim 12, wherein processing the electrodes on the insulating substrate to form the coil layer comprising:

making a curable metal paste into a pattern of the electrodes by a photolithography process, and then curing the curable metal paste at a temperature ranging from 150° C. to 200° C. to make the coil layer.

14. The thin-film power inductor according to claim 12, wherein the coil layer is made by a chemical plating process.

15. The thin-film power inductor according to claim 12, wherein the coil layer is single-layer, double-layer or multilayer.

16. The thin-film power inductor according to claim 12, wherein the block is secondarily pressed by an isostatic press, wherein the isostatic press performs pressing at a pressure ranging from 5 MPa to 50 MPa, during a time ranging from 1 minute to 30 minutes, and at a temperature ranging from 50° C. to 90° C.

17. The thin-film power inductor according to claim 12, wherein the silver paste is a cured silver paste, a curing temperature at which the cured silver paste is cured ranges from 120° C. to 200° C., and a curing time of the cured silver paste ranges from 30 minutes to 120 minutes.

18. The thin-film power inductor according to claim 12, wherein processing the electrodes on the insulating substrate to form the coil layer comprising:

opening a conductive hole in the insulating substrate, pouring a curable metal paste into the conductive hole by a screen printing process, and drying the curable metal paste poured into the conductive hole to form a conductive column;

forming a metal layer by sputtering on the insulating substrate, applying a photoresist on the metal layer, and then exposing and developing the photoresist such that a pattern of one of the electrodes appears on the photoresist;

etching a groove at a position on the photoresist where the pattern of the one of the electrodes appears; applying a photoresist again to fill the groove formed by etching and to cover the photoresist previously applied outside the groove; and exposing and developing all applied photoresist again and then removing the photoresist on the pattern of the one of the electrodes;

forming, by electroplating and thickening, the one of the electrodes on the pattern of the one of the electrodes, and removing the photoresist outside the one of the electrodes; and forming, according to above steps, another one of the electrodes on another side of the insulating substrate opposite to a side of the insulating substrate on which the one of the electrodes is located, wherein the electrodes on two sides of the coil layer are connected through the conductive column.

* * * * *